(12) United States Patent
Kulkarni et al.

(10) Patent No.: US 7,672,816 B1
(45) Date of Patent: Mar. 2, 2010

(54) WRINKLE-PREDICTING PROCESS FOR HYDROFORMING

(75) Inventors: Pravin N. Kulkarni, Wichita, KS (US); Ashwini Shashikiran, Wichita, KS (US); Prabhakar Shashikiran, Wichita, KS (US); Subhrangshu Datta, Cambridge, MA (US); Mark Virginia, Haysville, KS (US)

(73) Assignee: Textron Innovations Inc., Providence, RI (US)

( * ) Notice: Subject to any disclaimer, the term of this patent is extended or adjusted under 35 U.S.C. 154(b) by 528 days.

(21) Appl. No.: 11/383,857

(22) Filed: May 17, 2006

(51) Int. Cl.
*G06F 19/00* (2006.01)
(52) U.S. Cl. .................. 703/2; 703/1; 700/145
(58) Field of Classification Search .......... 700/165, 700/108–110, 97, 145; 702/83, 84; 703/1, 703/2, 6
See application file for complete search history.

(56) References Cited

U.S. PATENT DOCUMENTS

| | | | |
|---|---|---|---|
| 5,379,227 A * | 1/1995 | Tang et al. ............. 700/98 |
| 5,390,127 A * | 2/1995 | Tang et al. ............. 700/146 |
| 5,775,153 A | 7/1998 | Rigsby et al. |
| 5,860,306 A * | 1/1999 | Daehn et al. ............. 72/56 |
| 5,865,054 A | 2/1999 | Roper |
| 6,009,378 A * | 12/1999 | Tang et al. ............. 700/145 |
| 6,065,502 A | 5/2000 | Horton |
| 6,085,562 A * | 7/2000 | Daehn et al. ............. 72/57 |
| 6,208,982 B1 * | 3/2001 | Allen et al. ............. 706/11 |
| 6,227,023 B1 | 5/2001 | Daehn et al. |
| 6,257,035 B1 | 7/2001 | Marks et al. |
| 6,415,638 B1 | 7/2002 | Sakurai et al. |
| 6,550,320 B1 * | 4/2003 | Giustino ............. 73/146 |
| 6,588,244 B2 | 7/2003 | Chevalier |
| 6,631,630 B1 * | 10/2003 | Pourboghrat et al. ............. 72/60 |
| 6,632,296 B2 | 10/2003 | Yoshinaga et al. |
| 6,722,009 B2 | 4/2004 | Kojima et al. |
| 6,723,175 B2 | 4/2004 | Hanakawa et al. |
| 6,795,952 B1 * | 9/2004 | Stine et al. ............. 716/5 |
| 6,958,179 B2 * | 10/2005 | Carlson et al. ............. 428/40.1 |
| 6,970,754 B1 * | 11/2005 | Nanbu et al. ............. 700/97 |
| 7,025,847 B2 * | 4/2006 | Carlson et al. ............. 156/230 |
| 7,158,922 B2 * | 1/2007 | Sadagopan et al. ............. 700/97 |
| 7,447,614 B2 * | 11/2008 | Ghaboussi et al. ............. 703/2 |
| 2002/0069938 A1 | 6/2002 | Hanakawa et al. |
| 2003/0164036 A1 * | 9/2003 | Giustino ............. 73/146 |
| 2004/0172224 A1 * | 9/2004 | Sadagopan et al. ............. 703/2 |
| 2004/0206181 A1 * | 10/2004 | Coen et al. ............. 73/627 |
| 2005/0005692 A1 * | 1/2005 | Giustino ............. 73/146 |
| 2005/0102109 A1 * | 5/2005 | Dubois et al. ............. 702/39 |
| 2005/0199032 A1 * | 9/2005 | Krajewski ............. 72/379.2 |
| 2006/0011287 A1 * | 1/2006 | Carlson et al. ............. 156/230 |
| 2007/0251327 A1 * | 11/2007 | Broene ............. 73/769 |
| 2009/0012749 A1 * | 1/2009 | Ornjanovic ............. 703/1 |

FOREIGN PATENT DOCUMENTS

| | | | |
|---|---|---|---|
| JP | 7236923 A | | 9/1995 |
| JP | 8197153 A | | 8/1996 |
| JP | 2005173706 A | * | 6/2005 |

* cited by examiner

*Primary Examiner*—Charles R Kasenge
(74) *Attorney, Agent, or Firm*—Lathrop & Gage LLP

(57) ABSTRACT

Disclosed is a system and process which is a computer aided application using artificial intelligence modeling. This artificial intelligence model is able to predict the propensity for sheet metal parts to wrinkle when manufactured using a hydro forming process. The model uses geometric and material parameters to predict defects and facilitates defect predictions certainty into the ordinarily arduous redesign process directed at eliminating defects.

9 Claims, 6 Drawing Sheets

WRINKLE-PREDICTING PROCESS FOR HYDROFORMING

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The invention relates to the prediction of defects in the manufacture of products. More specifically, the invention relates to the prediction of wrinkling in the forming of sheet metal when using hydroforming or other like processes, as well as suggesting design solutions to the wrinkling problem.

2. Description of the Related Art

Traditionally, engineering or design groups would encounter and resolve sheet-metal wrinkling problems during hydroforming by trial and error. The tool designer would initially design the parts details per parameters handed down from product development staff. Next, through a process known in the art as "tool try-out," the designs are then manufactured into sample parts, or instead virtually analyzed by metal forming specialists to determine the formability or feasibility of the design. In the event the part winkled on manufacture, or if preliminary analysis predicted possible wrinkling, the part would be completely redesigned and the process repeated. The defective parts produced may in some circumstances be reworked to remove the wrinkles by hitting the part with a mallet (hereinafter referred to as "hand forming"). In other circumstances the defective part may be used as is in the wrinkled state if allowed by design constraints.

Simulations have been used by artisans for analyzing wrinkling problems. These processes, however, are accurate only when the design exhibits a tendency to wrinkle severely. These conventional simulations are less accurate for minor hand-formable wrinkles, i.e., wrinkles that can be smoothed with minor manual rework. The simulation software currently used does not provide any recommendations to prevent failure due to wrinkling. Instead, this software can only be used to analyze the effect without deciphering the cause of the wrinkling. Identifying the cause of failure and possible corrective action is the responsibility of the analyst. Because of this, the analyses are iterative, and each run of the analysis can take anywhere between a couple of hours to days to complete. These conventional procedures are inefficient, uneconomical, and extend product development cycle times significantly.

SUMMARY OF THE INVENTION

The system and methods of the present invention overcome these disadvantages of the conventional processes using a software tool which enables the user to predict defects given a particular material used. A simple entry of geometric and material information via a user interface module that enables the user to receive wrinkling information in real time. Further, the software characterizes the severity of the expected wrinkle and recommends changes in the geometric, material and process parameters in order to improve the formability or eliminate wrinkles during forming.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

To disclose a system and method for preventing the wrinkling during sheet-metal forming.

Various technical terms are used throughout this description. These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
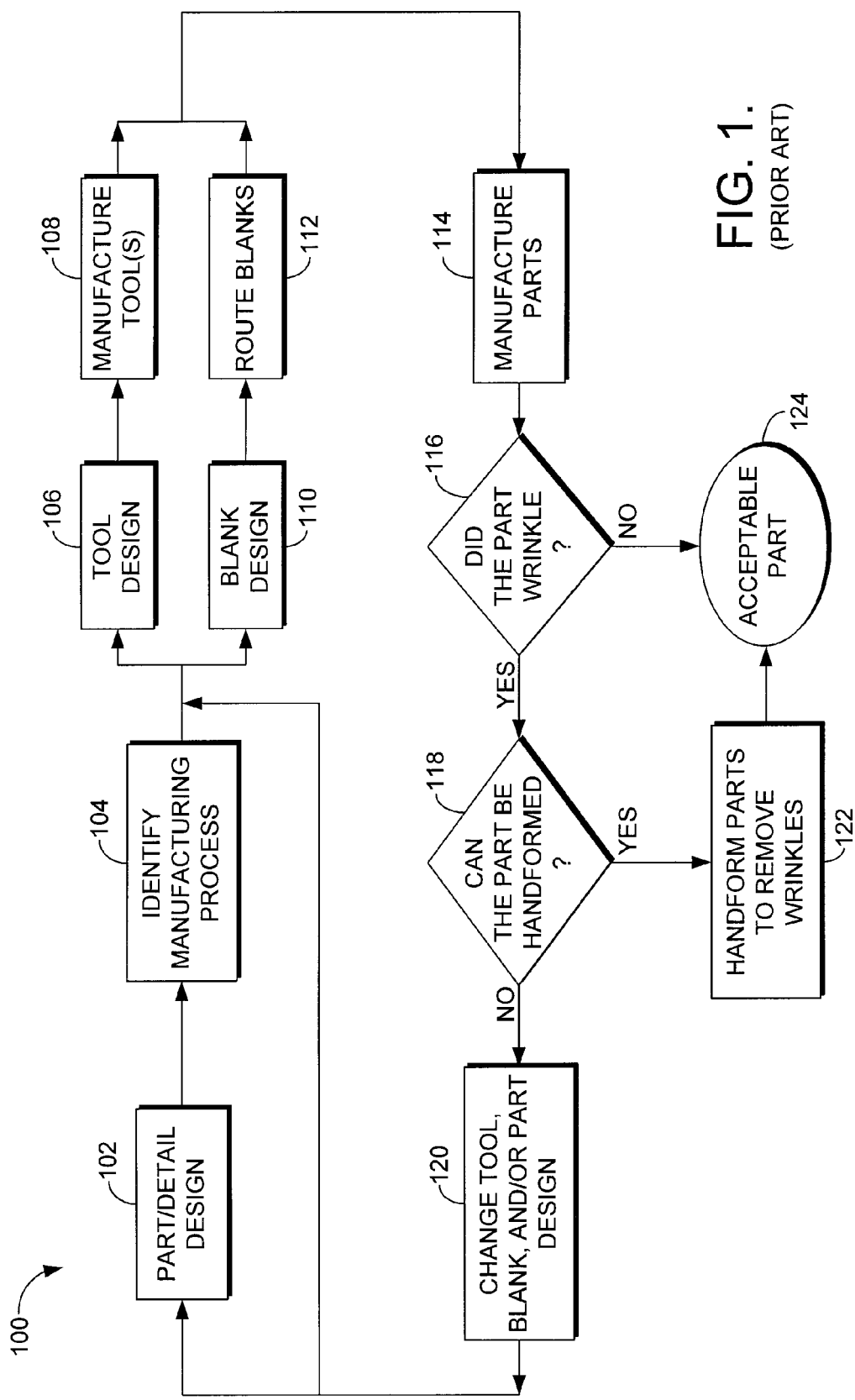
FIG. 1 is a representation of the conventional process used to manage wrinkling problems in part manufacturing.

Embodiments of the present invention are disclosed in FIGS. 1-6. Referring first to FIG. 1, a prior art process 100 for addressing wrinkling problems in hydroforming can be seen. In a first step 102, the engineer or project-manager designer must create a detailed design for the part which includes respective parameters (e.g., material type, part radius, sheet thickness, sector angle, fillet radius, and flange length). Once all these parameters have been identified and a perspective design created, the engineer/designer must identify the appropriate manufacturing processes in a step 104 which would be used to accomplish the design objectives.

Once the parts have been designed and the manufacturing process planned out, flow chart 100 splits into two concurrently ongoing branches. In a first branch, a tool design process 106 begins. These tools will be designed in a manner that they will produce a part with the details set forth in step 102. Once the tool has been designed in step 106, it must later be manufactured in a step 108. In the second branch of the process, a designer must come up with a blank design in step 110. The blank is the material which will be used to form the part. Once a blank design has been created which—when operated by the manufacturing tool—will create the desired article, these blanks will be routed in a step 112 for purposes of production.

Once both steps 108 and 112 have been concluded, the process again joins together at a step 114 in which the parts are actually manufactured. Once the parts have been manufactured in step 114, the wrinkle analysis begins with a query step 116. In step 116 it is determined whether or not the part has wrinkled. If a wrinkle is present, regardless of its magnitude and effect, the process will proceed to a second query step 108 in which is determined whether the part can be hand formed in a step 118. If the part has been manufactured with wrinkles but could not be hand formed, the process will move on to step 120. In step 120 the designer must change one or more of the tool, blank, and/or part design in an attempt to eliminate future wrinkling. Possibly, this will require the engineer to go back to the drawing board and redo detailed designs in step 102 and then reevaluate the manufacturing process in step 104. Alternatively, it is also possible the engineer will proceed on to steps 106, 108, 110, and 112 and simply alter tool designs and blank designs before manufacture in step 114.

Returning back to step 118, if a group of parts (or a single part) have shown wrinkles but can be hand formed, the arduous task of hand forming the parts to remove the wrinkles would be performed in a step 122. If design constraints allow hand forming, an acceptable part can be produced in a step 124.

In the event the FIG. 1 prior art process is successful in every aspect, then immediately following wrinkling query step 116 the process moves on to step 124 in which an acceptable part is produced without any required hand forming.

The prior art FIG. 1 process 100 has numerous disadvantages. For one, tool and blank design process of steps 106 and 110 are labor intensive and involve numerous product development engineering hours in tool creating, etc. Another disadvantage is the tremendous amount of time wasted by the process because of the potential for repeated detail designing and manufacturing requirements. This can be very detrimental to the company's bottom line. A third factor is material waste that is potentially caused by the imperfections (wrinkles) in which there could not be hand forming. And if hand forming is possible, this also requires additional man hours resulting in economic waste. Yet a further disadvantage is that these problems discussed above may force the company to engage in a more expensive process than hydroforming. For example, the company may be forced to draw form parts in order to avoid the extensive engineering time expense caused by wrinkling with the unpredictable conventional hydroforming processes.

Figure 2:
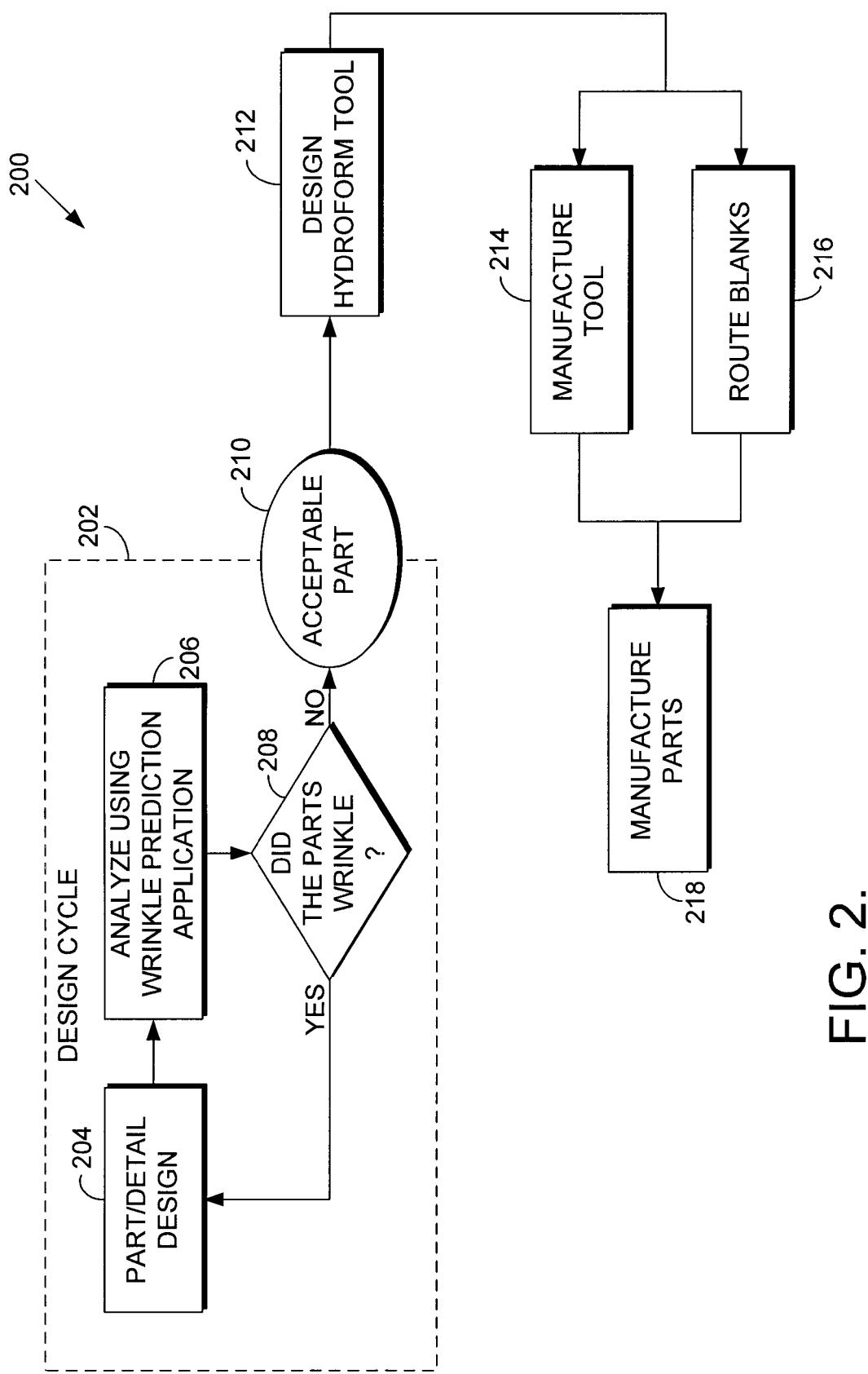
FIG. 2 is a high-level overview of one embodiment of the present invention.

One embodiment in the process to produce and prevent wrinkling of the present invention is disclosed in FIG. 2. FIG. 2 is a high-level view of a process which includes a part design process 202. Part design process 202 comprises several steps. A first step 204 involves making a part/detail design. This design will comprise a plurality of parameters (e.g., part radius, sheet thickness, sector angle, fillet radius, and flange length). Also included in the part design in step 204 is that a particular material (e.g., alloy) is selected of which the part will be constructed.

In a next step 206, these parameters will be analyzed using a wrinkle-prediction computer application which has already been created. The details of how the wrinkle-prediction tool is created are discussed in more detail later and depicted in FIG. 3. With respect to the data entry process, in one embodiment the parameters and the material are entered using fields which are provided on computer-generated screens. In the background, these screens are generated by the wrinkle-prediction application which is running on a computing system (e.g., on a Web server which may be accessed over an intranet, internet, or other networking arrangement). Though a networking arrangement is preferred, one skilled in the art will recognize that these processes could also be run on a stand-alone computer, e.g., a personal computer.

Figure 4:
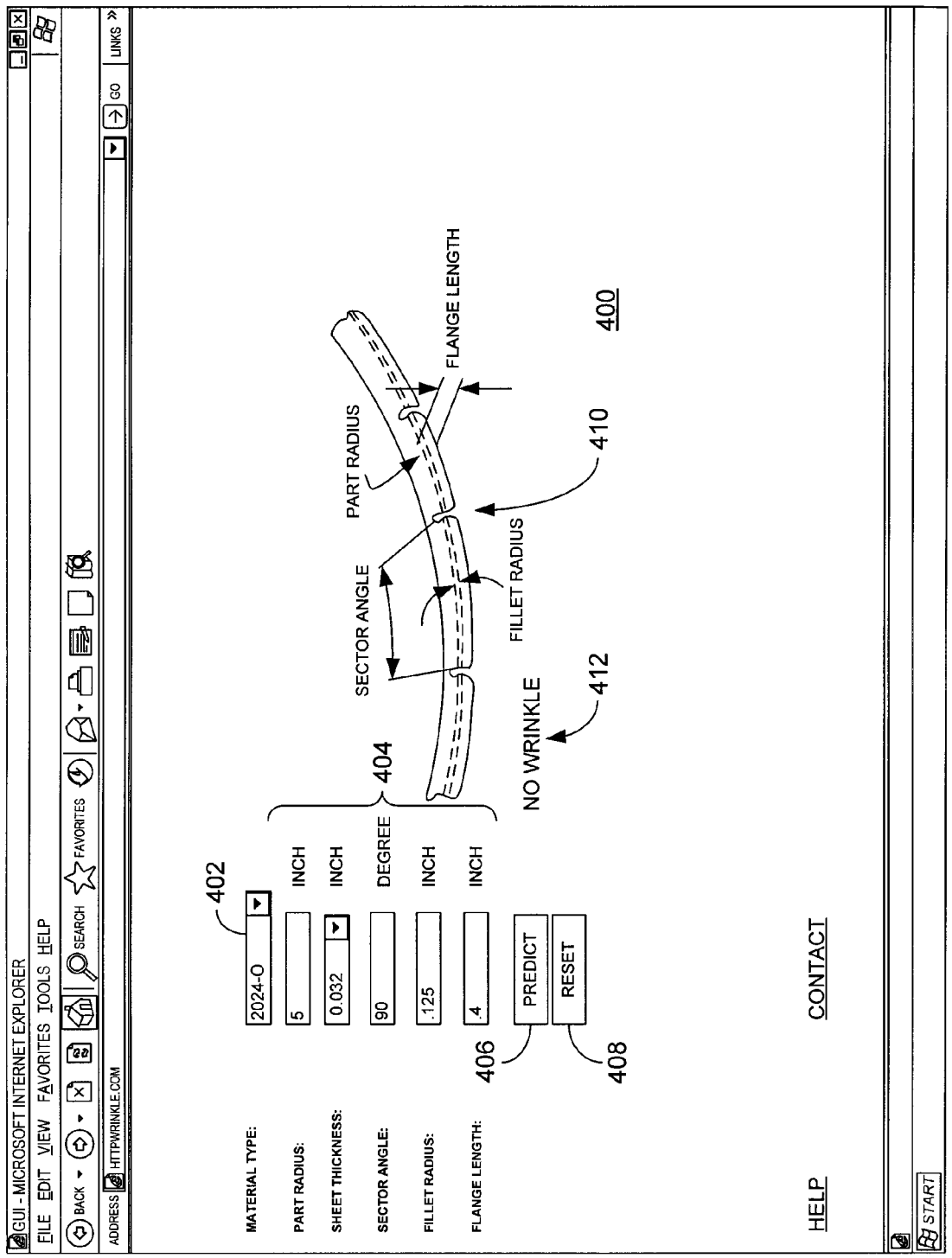
FIG. 4 is a graphic user interface (GUI) screen shot for one embodiment of the present invention showing parameters entered into fields and a result displayed where no wrinkle is detected.
Figure 5:
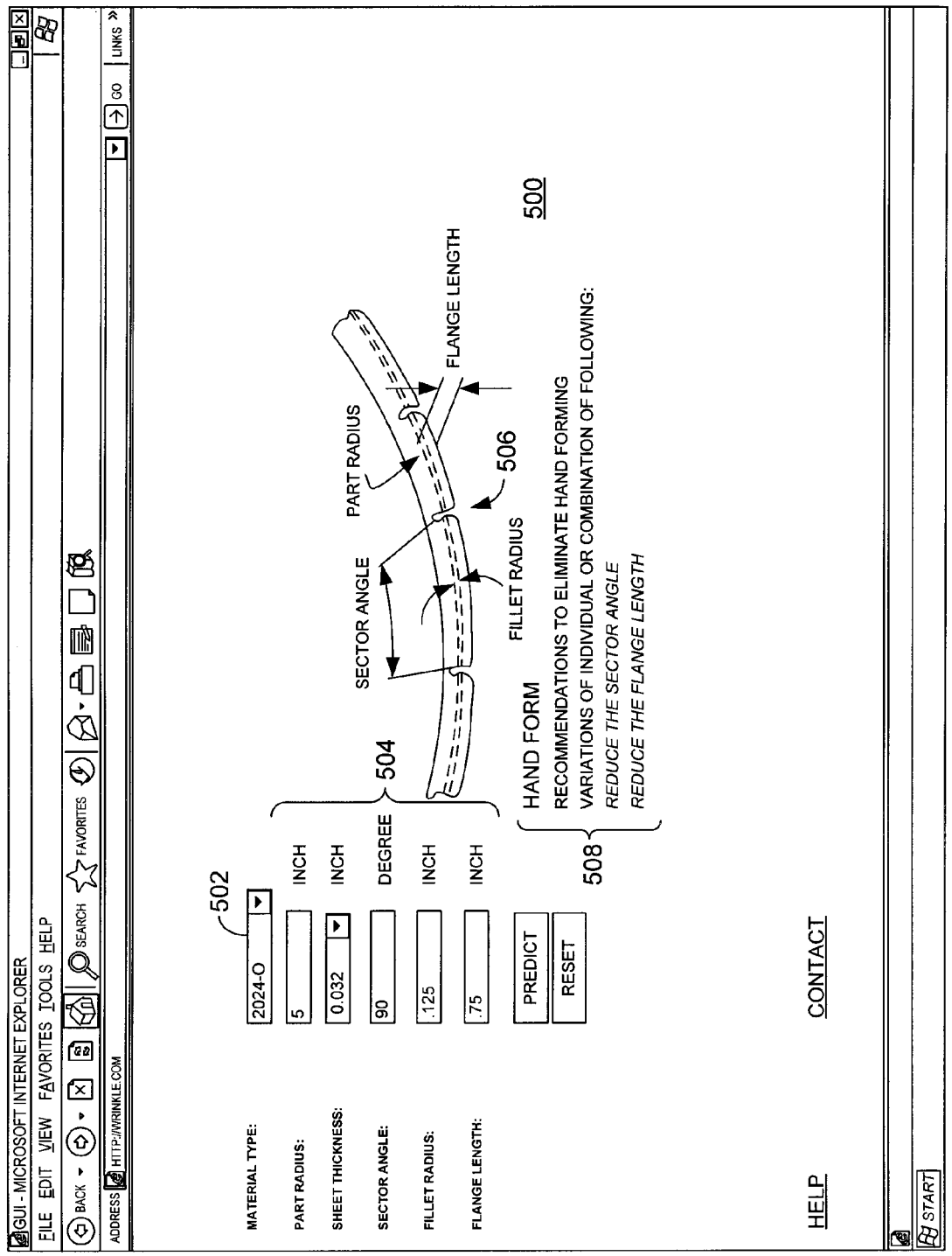
FIG. 5 is a GUI screen shot of one embodiment of the present invention in which parameters have been entered and a result shows wrinkling problems which have been detected but indicates that hand forming is a possibility.
Figure 6:
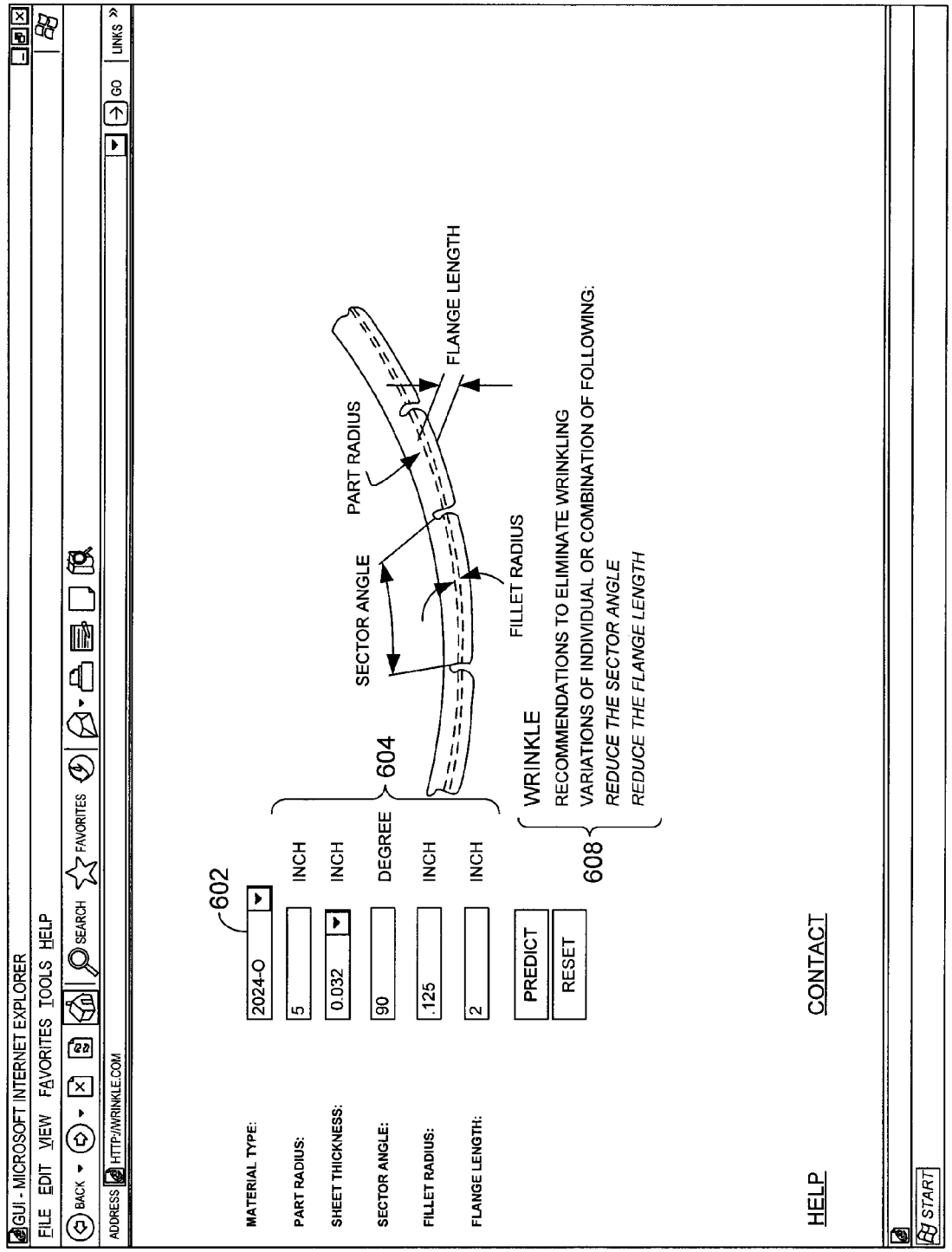
FIG. 6 is a GUI screen shot for one embodiment in the present invention showing a result in which wrinkling has been detected and is so severe that hand forming is not an option.

Embodiments for screens which might be used to collect data in step 206 may be seen in FIGS. 4-6. Referring to FIG. 4, for example, a computer screen 400 is shown which in the disclosed embodiment includes a plurality of fields. One field 402 includes a dropdown menu from which different alloys can be selected. In this figure the alloy 2024-0 is shown being selected. Below field 402 in FIG. 4 are a plurality of fields 404. Each of fields 404 enables the entry of a different parameter that the disclosed embodiment requires to predict wrinkling. In the example shown sheet thickness is disclosed as being enterable using a dropdown menu, whereas the other values are simply typed into the field. But other fields could be created as dropdown menus as well, or alternatively the sheet thickness field could be presented as a simple data entry field like the others. The invention should not be considered to be necessarily limited to any particular data entry screen configuration or process.

Once all of the material type and other parameters have been entered in the appropriate fields (shown in completed in FIGS. 4-6), the user can execute the analysis step 206 by pressing a "PREDICT" icon 406 to execute the prediction process. Thus, material type and parameters entered will be analyzed by the wrinkle-prediction application in step 206 and deliver results in real time.

One skilled in the art will recognize that the prediction application could be run locally on a PC on which screen 400 is displayed, but in the preferred embodiment, this screen is displayed on a work station on a network (either an intranet or over the internet) and the application is run on a server. After predict icon 406 has been clicked by the user, a result 412 will be displayed. This result, in FIG. 4 is displayed as "no wrinkle" indicating that the design can be manufactured without defects.

In another example 500 shown in FIG. 5, the same material 2024-0 is selected in a field 502 as well as a number of other parameters shown in a plurality of fields 504. Once entered, the prediction application is shown to display a result 508 on the screen in real time. For example, once the selections are entered, the process normally takes less than a second. In this case the parameters for the material entered have resulted in a recommendation that the user "hand form" the part even though a defect has been detected. Hand forming is normally only possible if the wrinkling is less severe.

Results 508 also include recommendations. These recommendations will give the user specific instructions which may be followed in order to correct the problem and avoid hand forming in the future. These instructions are generated using automated technologies as will be discussed in more detail hereinafter. But in the FIG. 5 example, the parameters entered have resulted in a display of a directive to individually or dually "reduce the sector angle" and/or to "reduce the flange length." Other results could be obtained granted different parameters were entered in fields 502 and 504.

FIG. 6 shows a case where different set of parameters have been entered into a field 602 and a different result obtained. In FIG. 6, a field 604 reveals the result that a wrinkle exists. Also displayed are the recommendations—like in FIG. 5—to try variations of individual or combined reductions in sector angle and flange length to avoid the need for hand forming. As discussed, automated techniques are used in the preferred embodiment that result in these recommendations being made.

The display of result outputs in one of fields 412, 508, and 608 concludes the step 206 wrinkle-prediction process. Once these results are known, the user in a query step 208 immediately knows what to do without having to have actually manufactured any tools or prepared any blanks. Instead, the answer to the step 208 query will direct the FIG. 2 production process in one of two directions. If, as shown in FIGS. 5 and 6, the part design parameters have resulted in simulated wrinkling, step 208 will direct the process back to step 204 where the user will select new parameters and change the part design so that wrinkling will be prevented. To do this, the user will also have been given the FIG. 5/FIG. 6 directives of "reducing the sector angle" and/or "reducing the flange length" as reflected in FIGS. 5 and 6. This information will help the engineer decide what new values should be selected so that a greater chance for a wrinkle-free design will be possible in revisited step 204.

If however, in step 208 no wrinkling is detected as disclosed in screen shot 400 in FIG. 4, the FIG. 2 process will be directed to a step 210 in which a wrinkle-free part design is the result. When this occurs, the process will then proceed to a step 212 in which the user, equipped with the knowledge that wrinkling will not result from manufacture of the designed part, is able to confidently design a hydroform tool in a step 212 which is not likely to have to be redesigned later.

Once the hydroform tool design has been completed, the process branches out into two simultaneously performed steps 214 and 216. In a step 214 the tool manufacturing will occur. In a step 216 the blanks are routed in configured for production. These steps can be made, considering the fact that design cycle 202 was exceptionally reliable, with the confidence that they will not have to be repeated because of design defects.

Finally, in a step 218, the parts can be manufactured with the confidence that the product will be wrinkle free. It is important to note that the FIG. 2 process can occur repeatedly without the trial and error process of manufacturing sample parts to physically test whether wrinkling will occur during part manufacturing. This provides the advantages mentioned above (e.g., the reductions in the costs of materials and man hours typically necessary with conventional processes).

Figure 3:
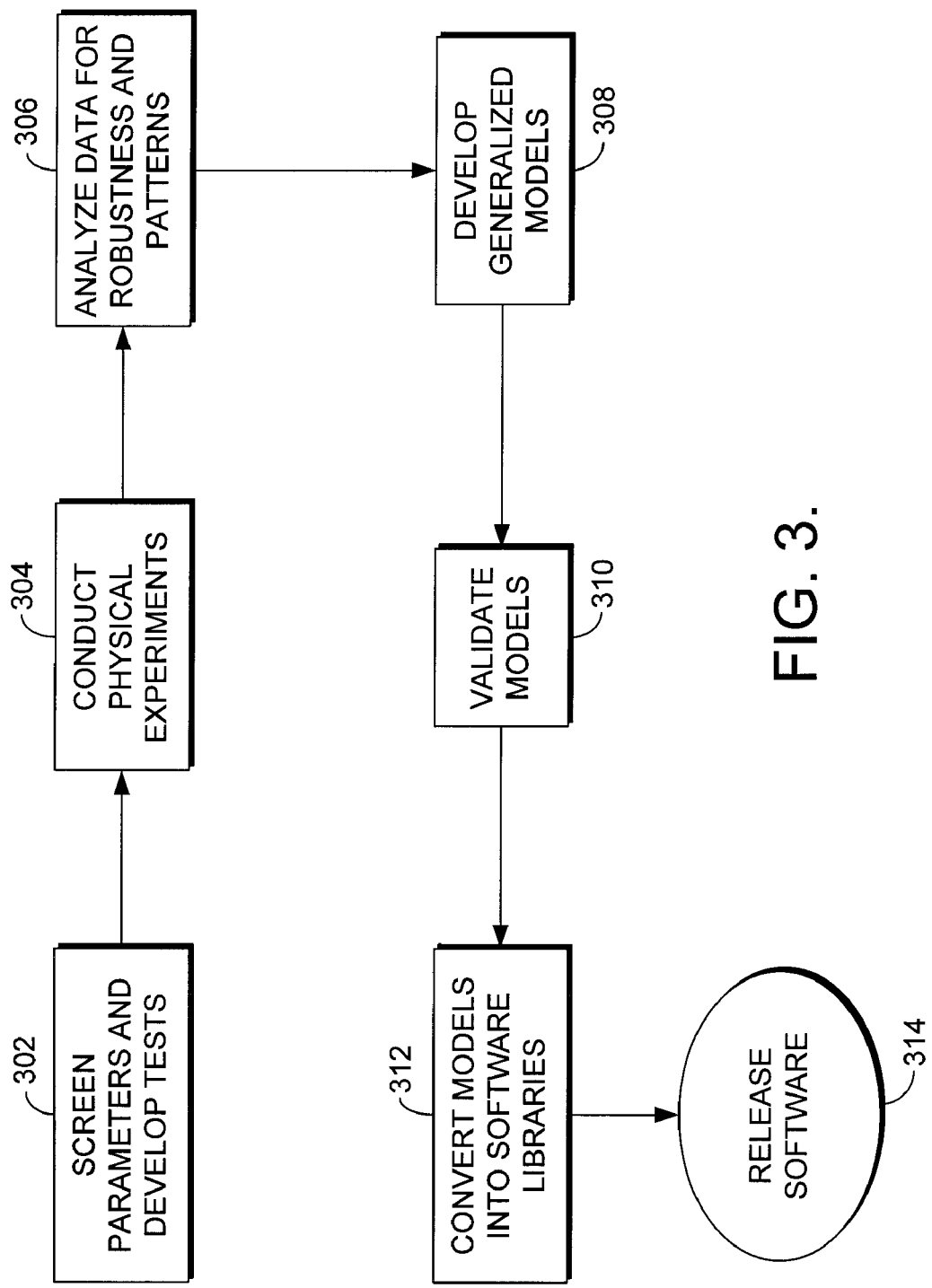
FIG. 3 is a flow diagram showing one embodiment for the wrinkle prevention application of the present invention.

The highly reliable analysis provided in step 206 is made possible due to a preliminary process which is set forth in FIG. 3. The FIG. 3 process 300 is a schematic showing the method for developing the wrinkling-prediction tool utilized. Referring to the figure, it may be seen that initially in a step 302, experimentation is planned. The manner of conducting experiments in step 302 will be within the knowledge of those skilled in the art of screening parameters to determine which parameters effect wrinkling. Furthermore, tests are developed for collecting data. This is all done using the Design of Experiment techniques. In this technique the various geometric, material, and process parameters thought to influence wrinkling in the manufacturing process are screened using a Taguchi screening technique, or any similar or equivalent Design of Experiments technique. Design of Experiment (DOE) is a known structured, organized method for determining the relationships between factors affecting a process (e.g., part manufacture) and the results of that process (e.g., defects, or no defects).

In the preferred embodiment here, full factorial or partial/reduced matrices based on the results of Design of Experiment tests are used to conduct physical experiments to collect data about the process in a step 304. In accomplishing steps 302 and 304, the trials in the preferred embodiment are separated by material type. For example, the material 2024-0 as shown in the embodiments disclosed in FIGS. 4 through 6 would include actual physical experiments conducted using differentiated parameters such as part radius, sheet thickness, sector angle, fillet radius, flange length, and potentially others.

In doing so, an initial group of parameters would be selected while changing one of the variables per the test at different values selected by the tester. For example, referring to FIG. 4, a sheet thickness of 0.032 inches, sector angle of 90°, a radius of 0.125 inches, and a flange length of 0.4 inches might be tested at different part radii of 3 inches, 4 inches, 5 inches, 6 inches, 7 inches, and so on until a wide enough range for the relevent variable has been achieved. Next, for each of these radii tested, additional tests may be performed at different sheet thickness, sector angles, part radii, and flange lengths, until a comprehensive set of data can be produced. The data set when analyzed and tested can be used to create a model which will accurately simulate wrinkling results across a desired range of parameters not actually tested.

After the physical experiments in step 304 have been completed, the physical results of the produced test products are recorded and analyzed for robustness and patterns in a step 306. In step 306, a skilled artisan will know how to examine the data collected in step 304 and analyze it to observe trends in data and check if the results are repeatable. For example, if the data shows no wrinkling at 7 inches, wrinkling at a 6 inch part radius, and then no wrinkling again at a 5 inch radius, this might be indicative of a lack of robustness because an expected pattern (that the 5 inch test would reveal wrinkling) has not proved true. One skilled in the art will be able to analyze the data to recognize whether the testing results are providing output which is useful in prediction or is instead of little predicting value.

Once it is confirmed that the data set from the physical experiments is robust, the artisan will develop generalized models in a step 308. This process, at least in the preferred embodiment, is done using artificial intelligence to recognize relationships between the datasets generated from the physical experiments in step 304. These computer-rated techniques are employed to recognize the patterns in the data and develop generalized models that are valid over a wide range of process variables. Algorithms suitable for learning using sparse datasets are implemented to enhance the quality of learning in the case of partial/reduced experiment matrices. One existing mathematical technique which may be used to accomplish these objectives is that of establishing Neural Networks.

Neural Networks will be known to those skilled in the art as algorithms which are designed to derive generic trend-based models from datasets, much as is capable of being done by the human mind, even if these datasets have outliers or are incomplete or otherwise inexact. Such models can be used to predict results for datasets which were not actually included in the physical experiments conducted in step 304. Thus, wrinkling results for datasets can be predicted even though no physical tests have been conducted for those precise data points. Therefore there is no need for an actual physical experiment to be conducted for any given set of parameters so long as an accurate model can be created in a step 308.

The accuracy of the models created is then validated in a step 310. Validation step 310 is accomplished by physically experimenting with articles manufactured according to a given set of data points, and then comparing the output (e.g., wrinkling) to predict results. Then, the same set of data points are mathematically manipulated using the model created to determine whether the same result (e.g., a determination of wrinkling) is achieved. Repeating numerous experiments in this fashion will enable one skilled in the art to determine whether the model created in step 308 is valid and useful as a prediction tool. It is important to note that the physical experiments conducted in step 310 are different from the initial physical experiments conducted in step 304. In practice, steps 304 through 310 will be repeated over and over until it is determined that a good generalized model has been produced which is useful in predicting at an acceptable level of accuracy.

Next, in a step 312 the models generated by the execution of process steps 304, 306, 308, and 310 are converted into software libraries in a step 312. Using these libraries, the wrinkle-prediction tool is able to receive the entries from the user and then call up the appropriate model for a particular set of entries made in the interfacing screens. (See FIGS. 4-6.)

The models are saved on the database by type of material. Thus, by selecting a particular material type from dropdown menu 402, the user will be able to obtain the model for that particular material type (a 2024-O alloy in the FIG. 4 embodiment).

Because the results for the entered data set is received almost instantly in real time, the wrinkle-prevention software will help a user to avoid the trial and error conventional processes, thus saving time, effort, and expense. These software libraries may be adapted to be accessed for use as in both stand-alone and Web-based versions of the wrinkle-prediction application. As already referenced above, the graphical user interface (GUI) of the software for the preferred embodiment using a Web-based version is presented in FIGS. 4 through 6. Once these libraries have been created, the software is released for use by the company, entity, or other user in a step 314 and will be useful in eliminating waste and improve utilization of resources.

As can be seen, the present invention and its equivalents are well-adapted to provide a method and system for the prediction of wrinkling in the forming of sheet metal when using hydroforming or other like processes, as well as suggesting design solutions to the wrinkling problem. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of the invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the order described.

The invention claimed is:

1. A system for predicting wrinkling in a part to be manufactured according to a new metal part design, said system comprising:
    a computing device;
    a computer process running on said computing device, said process adapted to receive: (i) a plurality of part design parameters for said metal part design, and (ii) and a part design material for said metal part design into said computer process;
    wherein said process accesses a wrinkle-prediction model developed using an artificial neural network and then mathematically manipulates said plurality of part design parameters using said wrinkle-prediction model to predict the existence of said wrinkling in an actually manufactured part; and
    wherein said process provides a prediction of the possibility of said wrinkling of the part based on geometric and material characteristics of the part design.

2. The method of claim 1, wherein said process provides a recommendation for the geometric characteristics, material characteristics and design parameters to be changed in order to improve the formability of the part being designed.

3. The method of claim 1, said process categorizes said prediction into one of non-removable wrinkling, hand formable wrinkling, and wrinkle-free.

4. A method for predicting wrinkling in a part design for a part to be constructed of a sheet metal material, said design including a plurality of selected design parameters, said method comprising:
    developing a wrinkle-prediction model, said model established by (i) conducting physical experiments using test parts comprised of said sheet metal material according to a plurality of experimental parameter sets; (ii) recording wrinkle information derived from results obtained regarding said test parts manufactured according to said experimental parameter sets, and then (iii) mathematically manipulating said wrinkle information to develop an artificial neural network for predicting said wrinkling;
    receiving said selected design parameters including geometric and material characteristics of a part to be designed; and using said wrinkle-prediction model to provide a prediction of the possibility of said wrinkling of the metal part based on geometric and material characteristics of the part design.

5. The method of claim 4, including providing a recommendation for the geometric characteristics, material characteristics and design parameters to be changed in order to improve the formability of the part being designed.

6. The method of claim 4, including categorizing the prediction into one of non-removable wrinkling, hand formable wrinkling, and wrinkle-free.

7. A method of predicting wrinkling in a part design, said part design including a plurality of selected part design parameters and a metal part design material, said method comprising:

developing a wrinkle-prediction model on a database using an artificial neural network;

providing a computer process;

receiving said part design parameters and said metal part design material into said computer process, wherein the design parameters include geometric and material characteristics of a part to be manufactured in accordance with said part design, said geometric characteristics including at least one of part radius, sector angle, sheet thickness, fillet radius, and flange length;

accessing said wrinkle-prediction model on said database and using said computer process;

predicting said wrinkling in said part design using said wrinkle-prediction model; and displaying a result to a user; said result including predicting the possibility of said wrinkling of the part if the part were to be manufactured in accordance with said part design parameters.

8. The method of claim 7, including providing a recommendation for the geometric characteristics, material characteristics and design parameters to be changed in order to improve the formability of the part being designed.

9. The method of claim 7, including categorizing the prediction into one of non-removable wrinkling, hand formable wrinkling, and wrinkle-free.

* * * * *

UNITED STATES PATENT AND TRADEMARK OFFICE
CERTIFICATE OF CORRECTION

PATENT NO. : 7,672,816 B1
APPLICATION NO. : 11/383857
DATED : March 2, 2010
INVENTOR(S) : Pravin N. Kulkarni et al.

It is certified that error appears in the above-identified patent and that said Letters Patent is hereby corrected as shown below:

Column 2, Line 45, "include" should read --includes--;

Column 4, Line 58, "shown in completed" should read --shown as completed--;

Column 5, Line 63, "routed in" should read --routed and--;

Column 8, Line 31, "and (ii) and a part" should read --and (ii) a part--;

Signed and Sealed this

First Day of June, 2010

David J. Kappos
*Director of the United States Patent and Trademark Office*